No. 779,740. PATENTED JAN. 10, 1905.
F. G. SCHENCK.
COFFEE URN.
APPLICATION FILED JULY 30, 1904.
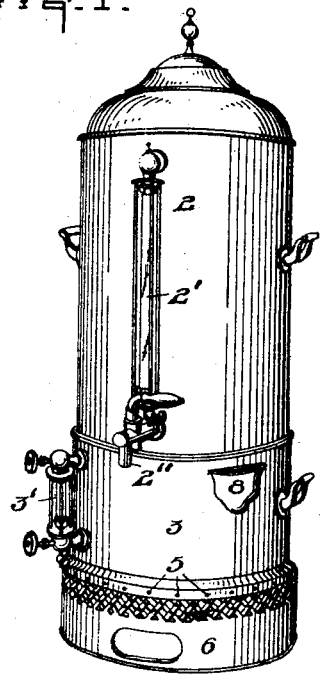
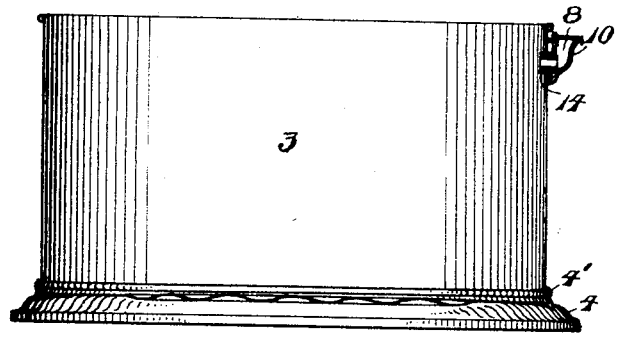
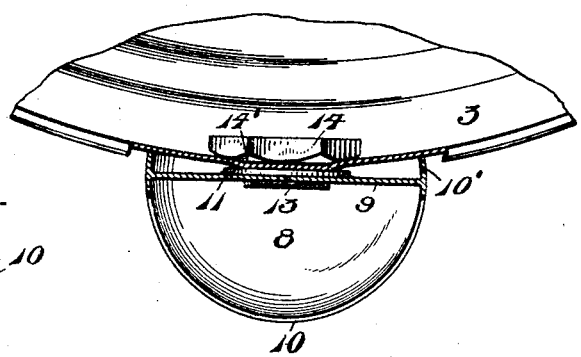
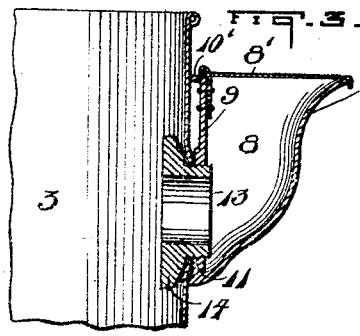
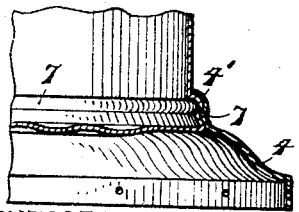
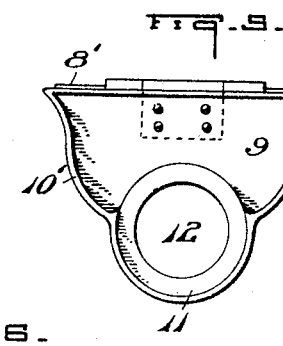
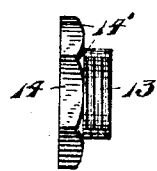
WITNESSES:
INVENTOR No. 779,740. Patented January 10, 1905.

UNITED STATES PATENT OFFICE.

FREDERICK G. SCHENCK, OF PITTSBURG, PENNSYLVANIA.

COFFEE-URN.

SPECIFICATION forming part of Letters Patent No. 779,740, dated January 10, 1905.

Application filed July 30, 1904. Serial No. 218,818.

*To all whom it may concern:*

Be it known that I, FREDERICK G. SCHENCK, a citizen of the United States, residing at Pittsburg, in the county of Allegheny and State of Pennsylvania, have invented certain new and useful Improvements in Coffee-Urns, of which the following is a specification, reference being had therein to the accompanying drawings.

This invention has particular reference to the boiler or reservoir which comprises the bottom compartment of a coffee-urn of usual and well-known construction.

The primary object is to provide the boiler with a filling-font of improved form, also to provide novel means for securing the font to the boiler.

In the accompanying drawings, Figure 1 is a side elevation of an urn equipped with a water-compartment embodying my invention. Fig. 2 is a vertical sectional view of the water-compartment, and Fig. 3 is a similar view of a portion of the same on an enlarged scale. Figs. 4 and 5 are detail views of the font. Fig. 6 is a similar view of the font-securing device.

Referring to the drawings, 2 designates the coffee-reservoir, which is removably mounted on the upper open end of water compartment or reservoir 3, as is usual in urns of this type. At the lower end of reservoir 3 is flange 4, which is secured, preferably by rivets 5, to base 6. The reservoir 3 is spun from sheet-copper, and hence is seamless. Near its lower end is the outwardly-bulging bead 7, and fitting around this bead is lip 4' of flange 4, thus securely uniting the latter with reservoir 3. Adapted to be inclosed by base 6 is a gas or other burner (not shown) for heating reservoir 3. The latter is provided with gage 3', while coffee-compartment 2 is equipped with the usual gage 2' and draw-off cock 2''.

The filling-font 8 is preferably formed of a single casting of brass or bronze and has a straight back wall 9 and a curved front wall 10. 8' is the hinged cover.

The edges 10' of the font project beyond wall 9 and are so curved as to fit the outer curved side of reservoir 3. Integral with back wall 9 is boss 11, through which is formed threaded passage 12 for receiving the threaded shank 13 of tubular nut 14 from within the boiler, the latter being formed with an aperture to pass the same. The inner face 14' of the nut which bears against the inner surface of the boiler is rounded, as shown, so as to seal the connection when drawn up tight without the use of rubber or other packing. Owing to the engagement of edges 10' with the outer surface of the reservoir, back wall 9 stands away from the latter, and hence nut 14 operates to draw edges 10' tightly against the outer surface of the reservoir and the spring of the sheet metal, caused by the opposing pressures of edges 10' and nut 14, operates to tightly secure the font. The construction is preferably such that when nut 14 is tightened it forces the sheet metal of the reservoir against the face of boss 11, thus materially increasing the effectiveness of the seal.

With the font constructed as shown the securing means is concealed and at the same time forms a passage from the font to the reservoir. While the font is securely fixed in position, it may be readily removed and as easily and quickly replaced.

I claim—

1. The combination of a sheet-metal reservoir-wall, a font having a rear wall spaced from the reservoir-wall, and clamping means adapted to unite said walls and spring the reservoir-wall toward the font-wall.

2. The combination of a sheet-metal reservoir-wall, a font having a rear wall spaced from the reservoir-wall, and securing means extending through both walls and adapted to spring the reservoir-wall toward the font-wall.

3. The combination of a sheet-metal reservoir-wall having an opening, a font having a rear wall spaced from the reservoir-wall and formed with a threaded opening, and a tubular exteriorly-threaded member extending through the openings in both of said walls and formed with an enlargement adapted to engage the inner surface of the reservoir-wall, whereby the connecting member operates to spring the reservoir-wall toward the font-wall when uniting said parts.

4. The combination of a sheet-metal reservoir having an opening, a font having an opening in its rear wall, projections on the font for engaging the reservoir and holding the apertured walls of the reservoir and font spaced apart, and a uniting member extending through said openings and operating to spring outward the sheet metal of the reservoir toward the rear wall of the font and between the projections on the latter, thus holding said projections in tight engagement with the reservoir.

5. The combination of a reservoir, a font having its rear wall formed with a single opening, the rear side or edge of the font being shaped to fit the exterior of the reservoir, and a single securing device extending through an opening in the reservoir and uniting with the opening in the rear wall of the font for holding the rear side or edge of the latter in tight engagement with the reservoir.

6. The combination of a reservoir having an opening, a font adapted to discharge through the opening and having edges projecting from its rear side for engaging the outer surface of the reservoir, and securing means adapted to hold said font edges tightly against the reservoir.

7. The combination of a reservoir, a font adapted to discharge into the reservoir, the font having rear edges projecting beyond its rear wall and adapted to bear against the outer surface of the reservoir, and a securing device uniting the reservoir and the rear wall of the font.

In testimony whereof I affix my signature in presence of two witnesses.

FREDERICK G. SCHENCK.

Witnesses:
   J. M. NESBIT,
   ALEX. S. MABON.